United States Patent [19]

Morris et al.

[11] Patent Number: 4,899,786
[45] Date of Patent: Feb. 13, 1990

[54] BREAKAWAY FLUID COUPLING

[75] Inventors: John M. Morris, Auburn; Zdenek Gabrlik, Seattle; Charles J. Green, Vashon, all of Wash.

[73] Assignee: GT Development Corporation, Seattle, Wash.

[21] Appl. No.: 385,304

[22] Filed: Jul. 25, 1989

Related U.S. Application Data

[62] Division of Ser. No. 307,736, Feb. 7, 1989.

[51] Int. Cl.[4] .................... F16K 17/40; F16L 29/00
[52] U.S. Cl. ................. 137/637.05; 137/68.1; 137/614.01; 280/834
[58] Field of Search ............ 137/68.1, 637.05, 614.01; 280/8

[56] References Cited

U.S. PATENT DOCUMENTS

| | | | |
|---|---|---|---|
| 1,942,096 | 1/1934 | Hallerberg | 184/7 |
| 2,381,484 | 8/1945 | Blank | 137/118 |
| 2,537,212 | 1/1951 | Danielson | 137/119 |
| 2,590,918 | 4/1952 | Barnes | 137/462 |
| 2,614,866 | 10/1952 | Ulrich | 137/614.04 |
| 2,962,044 | 11/1960 | Charboneau | 137/456 |
| 2,970,607 | 2/1961 | Peck et al. | 137/456 |
| 3,026,070 | 3/1962 | Sutton et al. | 244/135 R |
| 3,035,797 | 5/1962 | Neuschotz | 244/135 R |
| 3,043,542 | 7/1962 | Neuschotz | 244/135 R |
| 3,049,143 | 8/1962 | Hellems et al. | 137/390 |
| 3,098,500 | 7/1963 | Gruber | 137/456 |
| 3,112,767 | 12/1963 | Cator | 137/614.06 |
| 3,312,431 | 4/1967 | Vogt | 244/135 R |
| 3,482,602 | 12/1969 | Jarnagan et al. | 137/614.03 |
| 3,490,491 | 1/1970 | Kopaska | 137/614.05 |
| 3,599,670 | 8/1971 | Gurner et al. | 137/614 |
| 3,630,214 | 12/1971 | Levering | 137/68.1 |
| 3,719,194 | 3/1973 | Anderson et al. | 137/68.1 |
| 3,858,910 | 1/1975 | Oetiker | 285/84 |
| 4,009,729 | 3/1977 | Vik | 137/614.05 |
| 4,090,524 | 5/1978 | Allread et al. | 137/68.1 |
| 4,213,482 | 7/1980 | Gondek | 137/614.01 |
| 4,232,697 | 11/1980 | Meisenheimer, Jr. | 137/68.1 |
| 4,323,094 | 4/1982 | Paulis et al. | 137/68.1 |
| 4,351,352 | 9/1982 | Meisenheimer, Jr. | 137/68.1 |
| 4,483,359 | 11/1984 | Robertson | 137/68.1 |
| 4,583,711 | 4/1986 | Johnson | 251/149.6 |
| 4,674,525 | 6/1987 | Richards et al. | 137/68.1 |

Primary Examiner—John Rivell
Attorney, Agent, or Firm—Joan H. Pauly

[57] ABSTRACT

Separate valve bodies (16, 18) are connected by a sleeve (24). The joint (26) between the first body (16) and the sleeve (24) is detachable by bending forces and resistant to tension forces. The joint (32) between the second body (18) and the sleeve (24) is detachable by tension forces and resistant to bending forces. Each joint (26, 32) includes an annular groove (28, 34) on the valve body (16, 18) and portions (30, 36) of the sleeve (24) extending radially into the groove (28, 34). Each valve body (16, 18) has a valve element (44) that moves axially inwardly to close the flow passage (42) when one of the joints (26, 31) is detached. The valve element (44) is normally retained in an open position by a ball detent (84). A projection (82) carried by the confronting valve body (16, 18) holds the ball (84) in a groove (62) on the element's shaft portion (56). In a vehicle (2) having two fuel tanks (4) connected by a crossover line (10), a valve (14) is positioned at each end of the line (10) between the line (10) and the associated tank (4).

2 Claims, 6 Drawing Sheets

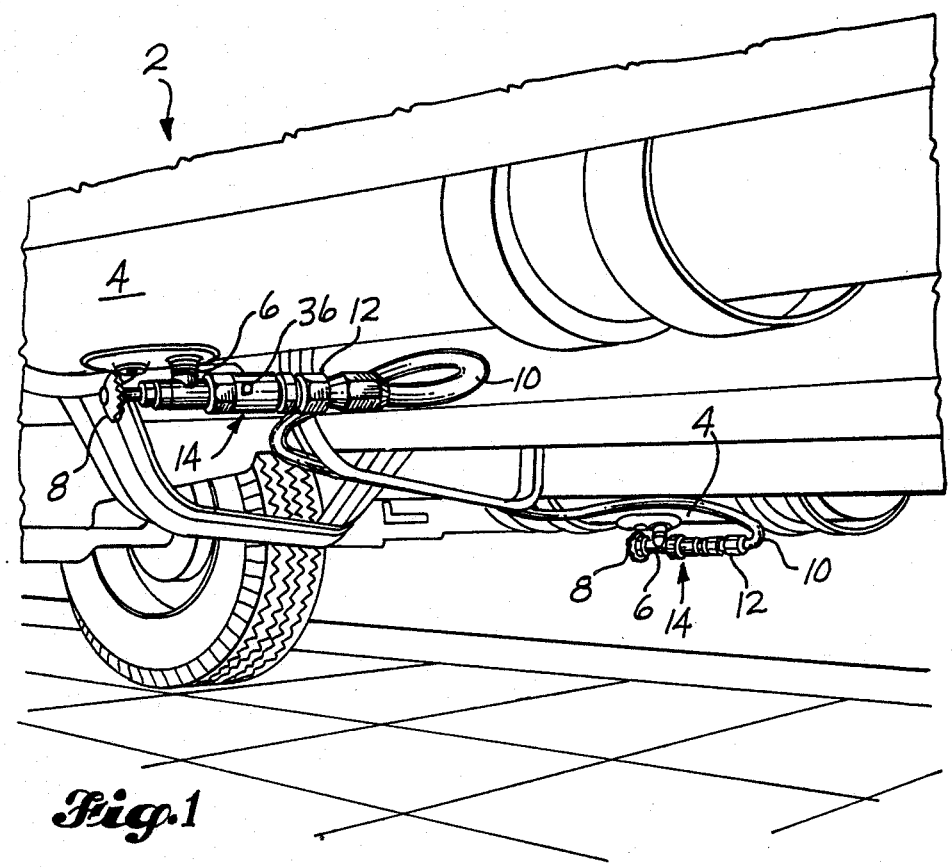
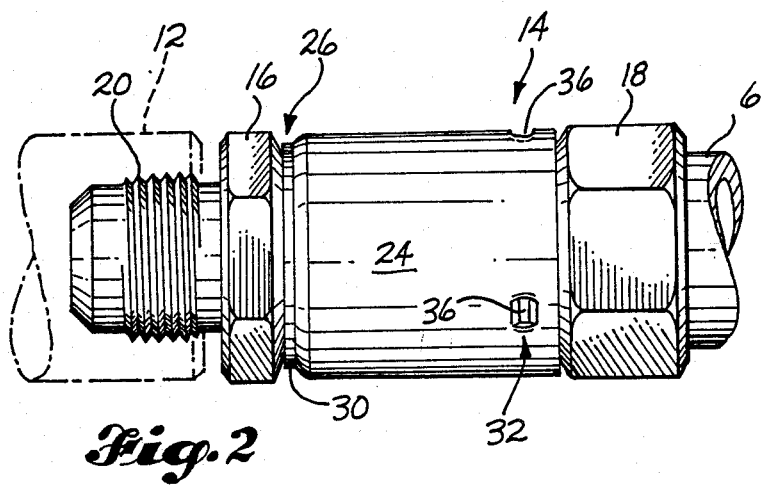

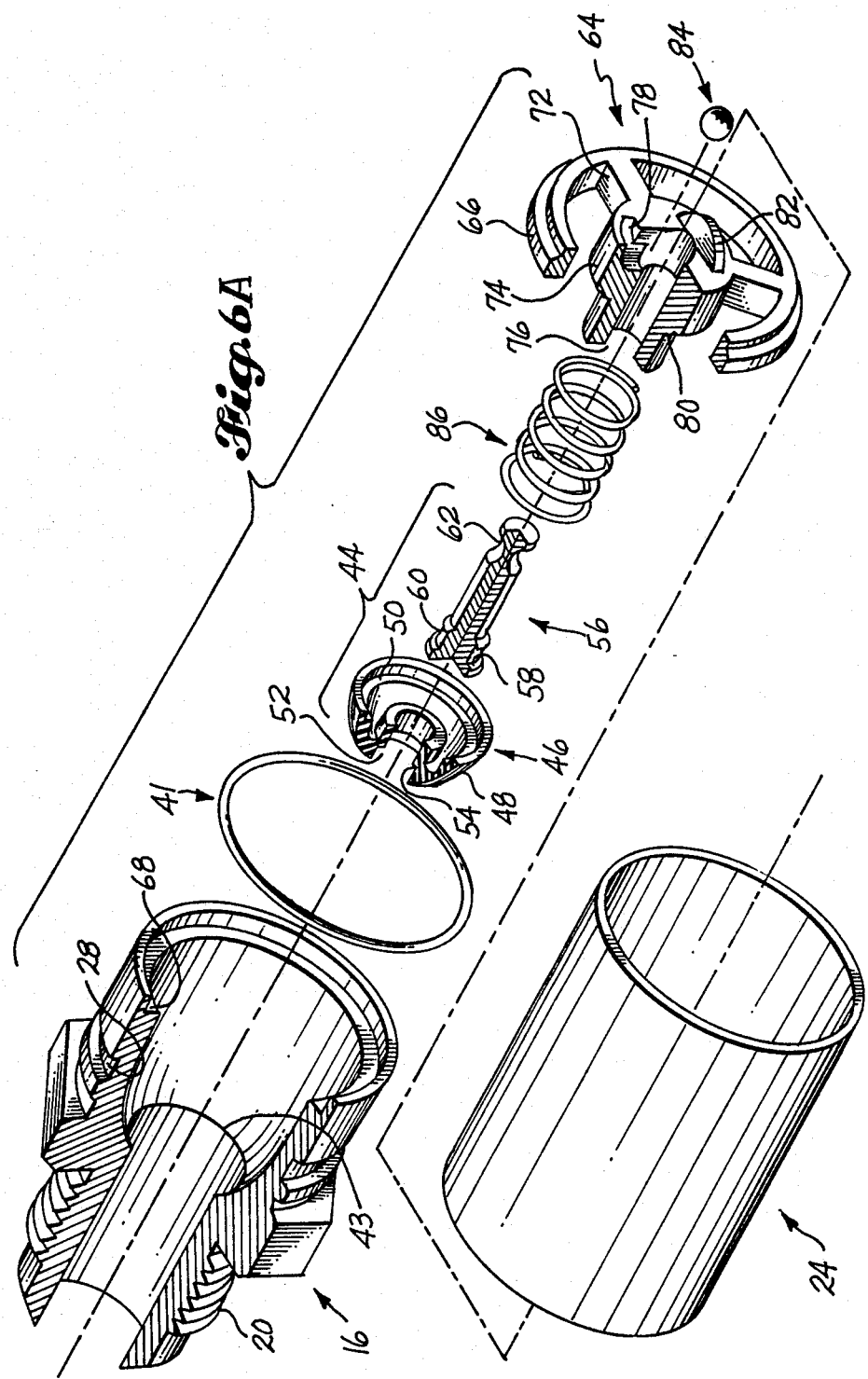

BREAKAWAY FLUID COUPLING

This application is a division of application Ser. No. 307,736, filed 2/7/89.

TECHNICAL FIELD

This invention relates to breakaway couplings in which each end of the coupling is sealed when the coupling is disconnected and, more particularly, to such a coupling for a fuel line in which a connecting sleeve is attached to confronting valve bodies by joints that are detachable by tension and bending forces, respectively, and in which the valve elements are prevented from moving apart to seat by support webs carried by the opposite valve bodies.

BACKGROUND ART

In heavy trucks with dual fuel tanks, the tanks are usually mounted on opposite sides of the frame, and the bottoms of the two tanks are connected by a crossover fuel equalization line. The crossover line must extend between the two tanks along the underside of the vehicle at its lowest point. Thus, the crossover line is vulnerable to being torn from the truck by road obstructions during normal use or in an accident. The tearing or breaking of the crossover line allows fuel to be spilled and thereby results in fuel loss and fire and other hazards.

Coupling joints with automatic sealing of both ends when the joint is separated are disclosed in U.S. Pat. Nos. 2,614,866, granted Oct. 21, 1952, to R. M. Ulrich; 3,026,070, granted Mar. 20, 1962, to R. W. Sutton et al.; 3,035,797, granted May 22, 1962, to R. Neuschotz; 3,043,542, granted July 10, 1962, to R. Neuschotz; 3,112,767, granted Dec. 3, 1963, to E. J. Cator; 3,312,431, granted Apr. 4, 1967, to C. L. Vogt; 3,482,602, granted Dec. 9, 1969, to M. Jarnagan et al.; 3,490,491, granted Jan. 20, 1970, to L. A. Kopaska; 3,599,670, granted Aug. 17, 1971, to J. R. Gurner et al.; 3,630,214, granted Dec. 28, 1971, to K. A. Levering; 3,719,194, granted Mar. 6, 1973, to D. M. Anderson et al.; 3,858,910, granted Jan. 7, 1975, to H. Oetiker; 4,009,729, granted Mar. 1, 1977, to A. M. Vik; 4,213,482, granted July 22, 1980, to J. T Gondek; 4,323,094, granted Apr. 6, 1982, to G. J. Paulis et al.; and 4,583,711, granted Apr. 22, 1986, to L. R. Johnson.

Anderson et al show a breakaway coupling for a helicopter or service station fuel line. The coupling includes a frangible sleeve that is connected to each of two separate confronting coupling bodies by frangible pins. The sleeve itself breaks under shear or bending forces. The pins break to allow the sleeve to disconnect from one or both of the bodies under axial, apparently tension, forces. The breaking of the sleeve or the pins allows the bodies to separate which in turn allows springs to seat valve members by moving them axially toward each other. In the assembled valve, under normal conditions, two triggers hold the valve members in their open positions. Each trigger has a longitudinal arm that abuts the valve member and a radial arm extending between confronting noses of spiders positioned in the outer ends of the bodies. Apparently, when the bodies separate, the triggers are allowed to fall away from the fuel line.

Levering discloses a fluid coupling for an aircraft fuel cell and hose or for adjacent fuel cells. In one embodiment, a central body is threadedly connected to a fuel cell fitting and a hose fitting. Bending or shear forces cause a rod holding the valve elements apart to become dislodged and thereby allow the valve elements to move toward each other and seat. Compressive forces collapse a narrow neck portion of the body resulting in fracturing of a shear pin positioned in the center of the rod to release the rod. In another embodiment, two fuel cells or tanks are connected to a bulkhead by a coupling. The coupling includes two fittings, each connected to its respective tank by a nut assembly. Radially extending shear pins connect overlapping portions of the fittings. Tensile forces shear the pins to allow the center rod to drop out as the fittings separate. Shear forces fracture the narrow neck of one of the fittings to allow the rod to drop out. Bending forces "likewise" fracture the narrow neck or the shear pins, or both, to allow the rod to drop out. In both embodiments, Levering discloses a rubber liner that stretches to seal the line to prevent leakage if the narrow neck is only partially broken.

The Sutton et al. patent, the two Neuschotz patents, and the Vogt patent each disclose a coupling for aircraft fuel cells. In each of the couplings, the valve elements are held apart by abutting members or by spring loaded plungers connected by a cable. The valves are actuated by the breaking of a frangible connecting member or by separating movement of the cells acting on a cable. The two Neuschotz patents and the Vogt patent disclose ball detents which hold the valve elements in their normal open positions.

Paulis et al disclose a breakaway valve assembly for an aircraft fuel inlet fitting. The assembly breaks apart under crash conditions to allow a fuel tank to separate from the fitting and the aircraft structure. The assembly includes a frangible sleeve with one end attached to the fuel tank by a flange and retaining ring and an opposite end threadedly connected to the fitting. An axially center portion of the sleeve has a circumferential groove formed thereon. When an axial tension load is created on the sleeve by movement of the fuel tank away from the aircraft structure, the sleeve fractures around the groove to allow the tank to freely separate. Each of the fractured ends are then sealed automatically by valve elements that are described as being "conventional".

Johnson discloses a coupler for an agricultural tractor hydraulic line. One end of the coupler is threadedly connected to a control valve or a rigid conduit on the tractor. The other end of the valve receives a nipple connected to an agricultural implement by means of a flexible hydraulic fluid line. The nipple is retained by a ball detent/sliding collar arrangement. The nipple and the valve each include a spring biased ball that seats, when the nipple and valve are separated, to close the respective joint end. Apparently, the balls hold each other in an unseated position when the nipple is connected. The coupler is described as allowing for breakaway without damage in the event of an accidental disconnect of the implement from the tractor. This is apparently accomplished by allowing an axial pull on the nipple to release the detent and pull the nipple away from the valve.

The Kopaska coupling device is also intended for use in a tractor hydraulic equipment line. The couplers disclosed by Cator, Jarnagan et al., Kopaska, Gurner et al., Vik, and Gondek each have two ends which are connected together by a ball detent/sliding sleeve arrangement. The Ulrich coupler ends are held together by a radial pin that is latched by a spring. In each of these seven patents, the two ends of the coupler are sealed by spring loaded valve elements when the coupler is disconnected. In the Ulrich and Cator couplers, ball valve members contact each other to unseat each other when the coupler is connected. In the Jarnagan et al. and Gondek couplers, a center spring holds the valve elements away from their seats. In the Kopaska and Gurner et al devices, pressure holds one valve element unseated and a plunger or piston unseats the other element. Vik discloses an intermediate cam and valve arrangement which holds the ball valves away from their seats.

Valves which close in response to remote line conditions are disclosed by U.S. Pat. Nos. 2,381,484, granted Aug. 7, 1945, to R. H. Blank; 2,537,212, granted Jan. 9, 1951, to J. A. Danielson; 2,590,918, granted Apr. 1, 1952, to W. E. Barnes; 2,962,044, granted Nov. 29, 1960, to G. W. Charboneau; 2,970,607, granted Feb. 7, 1961, to G. H. Peck et al.; 3,049,143, granted Aug. 14, 1962, to E. J. Hellems et al.; and 3,098,500, granted July 23, 1963, to T. J. Gruber. The Blank, Danielson, Peck et al., and Hellems et al. devices are designed to shut off an automobile hydraulic brake line when there is a leak or break in the line U S. Pat. No. 1,942,096, granted Jan. 2, 1934, to T. W. Hallerberg, discloses a control valve for a lubricating system which includes spring biased plungers that seat under changes of pressure.

The above-cited patents and the prior art that is discussed and/or cited therein should be studied for the purpose of putting the present invention into proper perspective relative to the prior art.

DISCLOSURE OF THE INVENTION

A subject of the invention is a breakaway fluid coupling According to an aspect of the invention, the coupling comprises a first valve body, a separate second valve body, a sleeve, and a valve element positioned in each of the valve bodies. The valve bodies define a flow passage through the coupling. The sleeve has a first end connected to the first body by a first joint and an opposite second end connected the second body by a second joint. The first joint is detachable by bending forces of a first predetermined magnitude and resistant to tension forces of a second predetermined magnitude. The second joint is detachable by tension forces of said second predetermined magnitude and resistant to bending forces of said first predetermined magnitude. The valve elements are positioned to allow flow through the flow passage when the valve bodies are connected by the sleeve, and to close the passage when at least one of the joints is detached.

Preferably, each of the joints comprises a groove on the respective valve body, and portions of the sleeve extending radially into the groove. The desired detachability and resistance of the joints may be obtained in various manners. For example, according to an aspect of the invention, the valve bodies have confronting radial end surfaces, the first joint is spaced axially from the end surface of the first body a first distance, and the second joint is spaced axially from the end surface of the second body a second distance greater than said first distance. This differential in the overlap of the sleeve on the valve bodies provides a greater overlap length to sleeve diameter ratio for the second joint than the first joint. This results in greater leverage being exerted by bending forces on the first joint than the second joint and, thereby, provides the desired greater resistance of the second joint to bending forces.

Another feature of the invention relating to the relative detachability and resistance of the joints is providing the portions of the sleeve in the first joint with a circumferential extent greater than the circumferential extent of the portions of the sleeve in the second joint. This arrangement achieves greater resistance to tension forces in the first joint than in the second joint. The arrangement may be provided separately or in combination with the differential sleeve overlap discussed above. In the preferred embodiment, the groove and the portions of the sleeve in the first joint extend circumferentially all the way around the first body, and the portions of the sleeve in a second joint include a plurality of circumferentially spaced dimples.

According to another aspect of the invention, the valve bodies have confronting outer end portions. Each valve element has a recess formed thereon. The coupling further comprises biasing means for biasing each valve element axially inwardly toward a seated position in which it closes the flow passage. A support web is carried by the outer end portion of each valve body and has a projection extending axially outwardly therefrom. The coupling has a ball detent corresponding to each valve element and received into the recess thereon. Each of the projections on the support webs is positioned to retain the ball detent in the recess on the valve element positioned in the confronting valve body to prevent the valve element from moving axially inwardly toward its seated position when the valve bodies are connected by the sleeve, and to allow the ball detent to move out of the recess and the biasing means to seat the valve element when at least one of the joints is detached. This arrangement of inwardly biased valve elements, and retaining means including support webs and ball detents has a number of advantages. It is relatively simple and compact in structure, easy to assemble, and reliable in operation. In addition, it helps minimize obstruction of the flow passage around the valve elements so that the presence of the coupling in a fluid line does not obstruct free flow of fluid.

Another subject of the invention is a system for preventing spillage of fuel due to accidental breakage of a crossover line in a vehicle of the type having two fuel tanks and a flexible crossover line extending between the tanks and communicating with the interior of each tank. According to an aspect of the invention, the system comprises a breakaway valve associated with each tank. Each of the valves has the basic characteristics and may have one or more of the preferred features of the coupling discussed above. In each valve, one of the valve bodies is attachable to a rigid structure carried by the associated tank, and the other of the valve bodies is attachable to the flexible crossover line. This positioning of the two valves provides secure protection against accidental spillage of fuel. When engagement of the crossover line by road obstructions creates forces on the line strong enough to tear the line from the vehicle or damage the line, one or both of the valves will be activated to prevent spillage of fuel from the associated tank or tanks. If the line is disconnected from one tank only, the loose end of the line will be sealed by the valve element in the valve body attached thereto. If a dangling line is subsequently torn from the other tank by an obstruction, the second valve will be activated to prevent spillage from the second tank.

Another subject of the invention is a fluid coupling comprising a first valve body and a second valve body releasably connected to the first body. The bodies have confronting outer end portions and define a flow passage through the coupling. A valve element is positioned in each of the valve bodies in the flow passage and has a recess formed thereon. Biasing means biases each valve element axially inwardly toward a seated position in which it closes the passage. A support web is carried by the outer end portion of each valve body and has a projection extending axially outwardly therefrom. The coupling also includes a ball detent corresponding to each valve element and received into the recess thereon. Each of the projections is positioned to retain the ball detent in the recess on the valve element positioned in the confronting valve body to prevent the valve element from moving axially inwardly toward its seated position when the bodies are connected, and to allow the ball detent to move out of the recess and the biasing means to seat the valve element when the bodies are detached.

In the preferred embodiment of the fluid coupling, each valve element includes a head and a shaft. The head forms a seating surface and a spring abutment substantially opposite the seating surface. The shaft extends axially outwardly from the head. Each web includes a spring abutment, a center axial opening for receiving the shaft of the corresponding valve element, and a second opening extending radially outwardly from the center axial opening for receiving the projection on the confronting web. The biasing means comprises a spring positioned between the spring abutments in each valve body.

The apparatus of the invention provides a relatively simple, compact, and economical means for solving the problem of fuel spillage discussed above. The differential detachability and resistance of the first and second joints contributes to both the versatility and reliability of the apparatus. They allow the responsiveness of the valve or coupling to bending forces and tension forces, respectively, to be easily and independently tailored to the needs of a particular application and, at the same time, ensure resistance to normal use and abuse. The groove and sleeve arrangement of the joints enhances the versatility of the valve or coupling and provides in a simple structure a number of parameters that may be varied in order to obtain desired relative resistances to different types of forces. In the system of the invention, the arrangement of the valves has the advantages of permitting the system to be readily retrofitted into an existing crossover line without cutting into the line itself and without interfering with existing fittings or shutoff valves. The system is highly versatile and can be incorporated into a variety of existing configurations. The dual-valve system also protects other crossover components during an impact. In addition, initial installation of the valves may be easily and quickly accomplished, and the valves may be easily and quickly replaced in the event of their activation.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a pictorial view of the system of the invention installed in a vehicle.

FIG. 2 is an elevational view of the preferred embodiment of the fluid coupling shown attached to portions of a crossover system.

FIGS. 6A and 6B together show an exploded pictorial view of the preferred embodiment of the coupling.

BEST MODE FOR CARRYING OUT THE INVENTION

Figure 3:
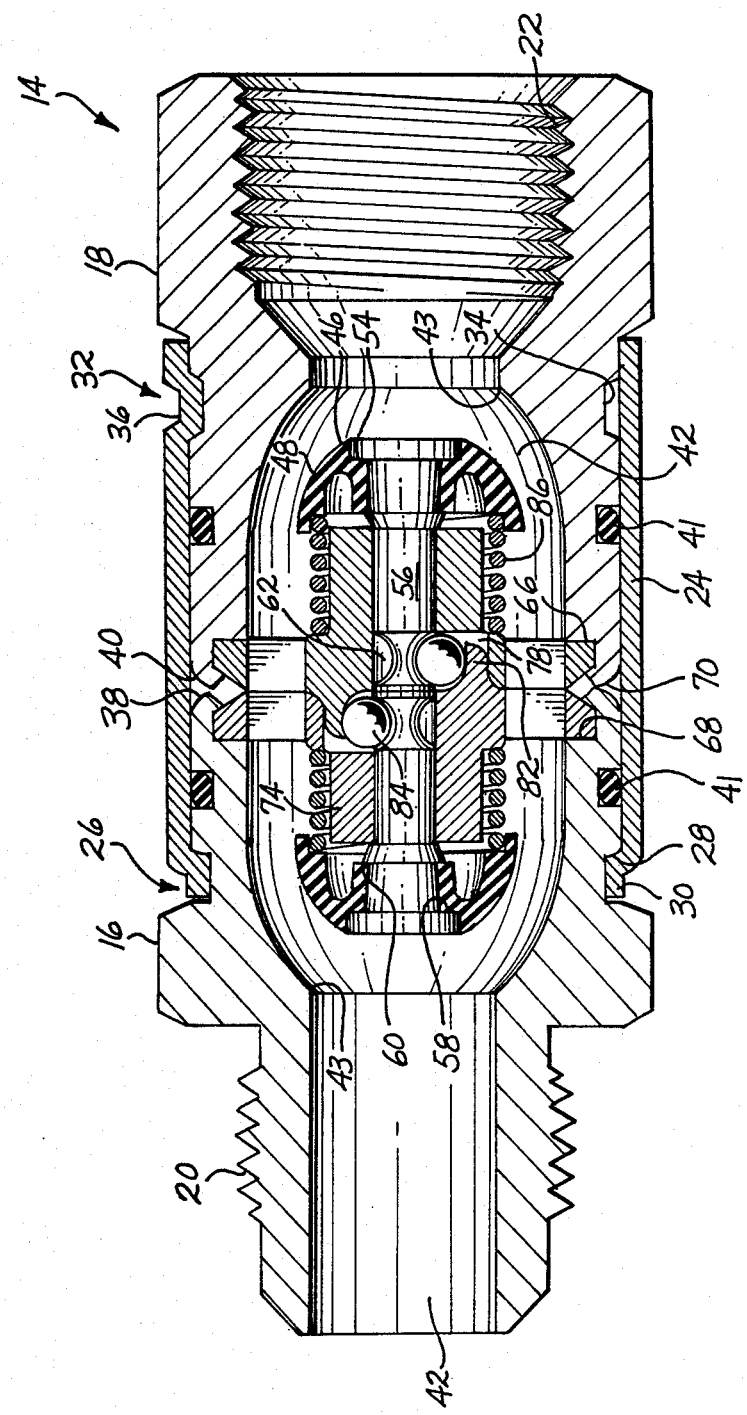
FIG. 3 is a sectional view of the preferred embodiment of the coupling with the valve bodies attached by the sleeve.

The drawings show apparatus that is constructed according to the invention and that also constitutes the best mode of the invention currently known to the applicant In FIG. 1, the system of the invention is shown incorporated into the tractor portion of a heavy truck. It is anticipated that the primary application of the valve or coupling of the invention will be in systems of the type shown in FIG. 1 and that the system of the invention will be used primarily in connection with the type of vehicle shown in FIG. 1. However, it is of course to be understood that the valve or coupling of the invention may also be used to advantage in other types of installations and that the system of the invention may be incorporated into other types of vehicles without departing from the spirit and scope of the invention.

Referring to FIG. 1, a heavy duty truck 2 has dual fuel tanks 4 mounted on opposite sides of the frame of the tractor portion of the truck. A flexible crossover line 10 traverses the underside of the tractor and extends between the two tanks 4. The line 10 communicates with the interior of each tank 4 by means of a rigid tank fitting 6 and a line fitting 12. The fitting 6 shown in FIG. 1 is a common type of fitting which extends vertically from the tank 4. The system of the invention may also be used in connection with other types of fittings, including those which extend horizontally from the tank structure In FIG. 1, a shutoff valve 8 is shown connected to each of the tank fittings 6. In some installations, the shutoff valve 8 is omitted. As can be seen in FIG. 1, the breakaway valve 14 of the invention is readily incorporated into the dual tank/crossover line configuration by simply positioning a valve 14 between each tank fitting 6 and its associated line fitting 12.

The breakaway device 14 of the invention functions as both a valve and a coupling. The structure of the assembled valve 14 is shown in FIGS. 2 and 3. The valve 14 includes a first valve body 16 and a separate second valve body 18. The bodies 16, 18 are provided with means for connecting them to other components of a fluid system. The first body 16 has external threads 20 for attaching it to the fitting 12 of the crossover line 10, as illustrated in FIG. 2. The second body 18 has internal threads 22 for attaching it to the fuel tank fitting 6.

The valve 14 also includes a sleeve 24 which is connected to and joins the two bodies 16, 18. As shown in FIG. 3, the connections between the sleeve 24 and the valve bodies 16, 18 are sealed by two O-rings 41. Each of the joints 26, 32 between the sleeve 24 and the bodies 16, 18 includes an annular groove 28, 34 extending circumferentially around the outer surface of the respective valve body 16, 18. Each joint 26, 32 also includes portions 30, 36 of the sleeve 24 extending radially into the groove 28, 34. In the first joint 26, the adjacent end portion 30 of the sleeve 24 extends into the groove 28 on the first valve body 16 circumferentially all the way around the first body 16. This is preferably accomplished by roll forming the end of the sleeve 24 into the groove 28. The material of the sleeve 24 is sufficiently malleable to permit the sleeve end 30 to take the shape of the groove 28 as it is roll formed. In the second joint 32, the portions of the sleeve 24 which extend into the groove 34 on the second body 18 comprise a plurality of circumferentially spaced dimples 36, FIGS. 1 and 2. The number of dimples 36 may be varied. In the preferred embodiment shown in the drawings, there are three evenly spaced dimples 36. The dimples 36 are formed by punching the sleeve material into the groove 34 at circumferentially spaced locations around the groove 34.

As described above, the two joints 26, 32 are designed to provide differential resistance to tension and bending forces. The first joint 26 is detachable by bending forces of a first predetermined magnitude and resistant to tension forces of a second predetermined magnitude. The second joint 32 is detachable by tension forces of the second predetermined magnitude and resistant to bending forces of the first predetermined magnitude. The first and second magnitudes are chosen to meet the needs of the particular type of installation in which the valve 14 is to be incorporated. In the system shown in FIG. 1, the magnitudes are chosen to provide responsiveness to both axial tension forces and bending forces at force levels sufficiently low to protect the other crossover components from damage and sufficiently high to withstand normal use and abuse of the system.

The groove and sleeve configuration of the joints 26, 32 described above provides a high degree of flexibility in the tailoring of the joints 26, 32 to obtain the desired differential responsiveness and resistance. In the preferred embodiment, the differential resistance to bending forces is provided primarily by the differential dimensioning of the overlap of the sleeve 24 on the two valve bodies 16, 18. The valve bodies 16, 18 have confronting radial end surfaces 38, 40. The first joint 26 is spaced axially from the end surface 38 of the first body 16 a first distance. The second joint 32 is spaced axially from the end surface 40 of the second body 18 a second distance which is greater than the first distance. Since the diameter of the sleeve 24 is essentially constant, the differential axial spacing of the joints 26, 32 provides a differential length of overlap to diameter ratio which in turn provides the desired differential resistance to bending forces, as described above.

The tailoring of the resistances of the joints 26, 32 to tension forces in the preferred embodiment is accomplished primarily by providing a differential circumferential extent of the portions of the sleeve 24 which extend into the grooves 28, 34 in the two joints 26, 32. The circumferential extent in the first joint 26 is much greater than that in the second joint 32 since the sleeve 24 is rolled into the groove 28 in the first joint 26 all the way around the first body 16, and the dimples 36 of the second joint 32 have a relatively small total circumferential extent, as can be seen in FIG. 2.

The relative strength of the groove and sleeve joints could also be provided in other ways. For example, varying the amount of sleeve material in the groove to vary the resistance to tension forces could be accomplished by means other than providing differential circumferential extent, as is done in the preferred embodiment. One way of doing this is to vary the depth of the two grooves. Another way is to roll a thinner portion of the sleeve into one joint than the other. This has been tried, but it proved to be less effective than the preferred differential circumferential extent arrangement. The strength of the joints is also affected by other factors, such as the shapes of the grooves. In the preferred embodiment, the angles of the side surfaces of the grooves have been specifically designed to obtain the desired responsiveness to tension and bending forces.

Referring to FIG. 3, in the assembled valve 14, the valve bodies 16, 18 define a flow passage 42 through the valve 14. In each of the valve bodies 16, 18, a valve element 44 is positioned in the flow passage 42. In the assembled valve 14, before actuation of the valve 14, each valve element 44 is retained in the open position shown in FIG. 3 by a web 64 that engages a ball detent 84, as described below. In this open position, the valve elements 44 allow free flow of fluid through the valve 14.

As shown in FIGS. 3-6B, each valve element 44 includes a head 46 and a shaft 56. The head 46 is made from an elastomeric material and has a substantially hemispherical outer surface A portion of this outer surface forms a seating surface 48. Then the valve 14 is actuated and the elements 44 move into their closed positions shown in FIGS. and 5, the seating surfaces 48 of the valve elements 44 are urged against seats 43 formed by portions of the valve bodies 16, 18 that define the flow passage 42. This closes the flow passage 42 in the respective valve bodies 16, 18. A radial surface of the head 46 forms a spring abutment 50 substantially opposite the seating surface 48. A center axial opening 52 extends through the head 46 for receiving the shaft 56.

The shaft 56 is received into the opening 52 in the head 46 and extends axially outwardly from the head 46. The shaft 56 is retained in the opening 52 by the engagement of two facing radially extending shoulders 58, against opposite surfaces of the head 46. The shoulder engages a shoulder 54 formed by a recess on the end of the head 46 facing the seat 43. The shoulder 60 engages a radial end surface of the head 46. The end of the shaft 56 opposite the head 46 has a recess 62 formed thereon for engaging the ball detent 84 mentioned above. In the preferred embodiment shown in the drawings, the recess takes the form of an annular groove 62.

In each valve body 16, 18, the support web 64 mentioned above is carried by the outer end portion of the body 16, 18. The web 64 includes an outer ring 66 and a center portion 74 which is connected to the ring 66 by three circumferentially spaced spokes 72. The spokes 72 are spaced and dimensioned so that they do not interfere with free flow of fluid through the flow passage 42. The web 64 is attached to the valve body 16, 18 by crimping of the inner end of the valve body, 16, 18 against the radial end of the ring 66, as shown at 70 in FIG. 3. The ring 66 is retained between the crimped portion 70 of the valve body 6, 18 and a radial shoulder 68 formed by the valve body 6, 18. In the assembled valve 14, the confronting webs 64 mate flush against each other.

The center portion 74 of the web 64 has a center axial opening 76 extending therethrough for receiving the shaft 6 of the corresponding valve element 44. The center portion 74 also has a second opening 78 extending radially outwardly from the center axial opening 76. A projection 2 positioned diametrically opposite the second opening 78 extends axially outwardly from the center portion 74 toward the confronting valve body 16, 18. A spring abutment 80 is formed on the center portion 74 inwardly of the second opening 78 and the projection 82.

As can be seen in FIG. 3, in the assembled valve 14, each of the projections 82 is aligned to be received into the second opening 78 in the confronting web 64 in the confronting valve body 16, 18. The shaft of the valve element 44 is received into the center opening 76 in the center portion 74 of the corresponding web 64 with the groove 62 on the shaft 56 aligned with the second opening 78. A ball detent 84 is positioned in the second opening 78 and extends into the groove 62. The projection 82 of the confronting web 64 extends into the opening 78 to retain the ball detent 84 in the groove 62. The engagement of the ball detent 84 in the groove 62 prevents the valve element 44 from moving axially inwardly toward its seat 43.

A coil spring 86 has opposite ends urged against the spring abutments 50, 80 formed on the valve element head 46 and web center portion 74, respectively, to bias the valve element 44 axially inwardly toward its seated position The ball detent 84 and projection 82 hold the valve element 44 against the force of the spring 86. When one of the joints 26, 32 is detached by tension or bending forces, the valve bodies 16, 18 move away from each other and the projections 82 move out of the openings 78. This permits the ball detents 84 to move radially outwardly in the openings 78 and thereby allows the springs 86 to move the valve elements 44 axially inwardly toward their seated positions.

Figure 4:
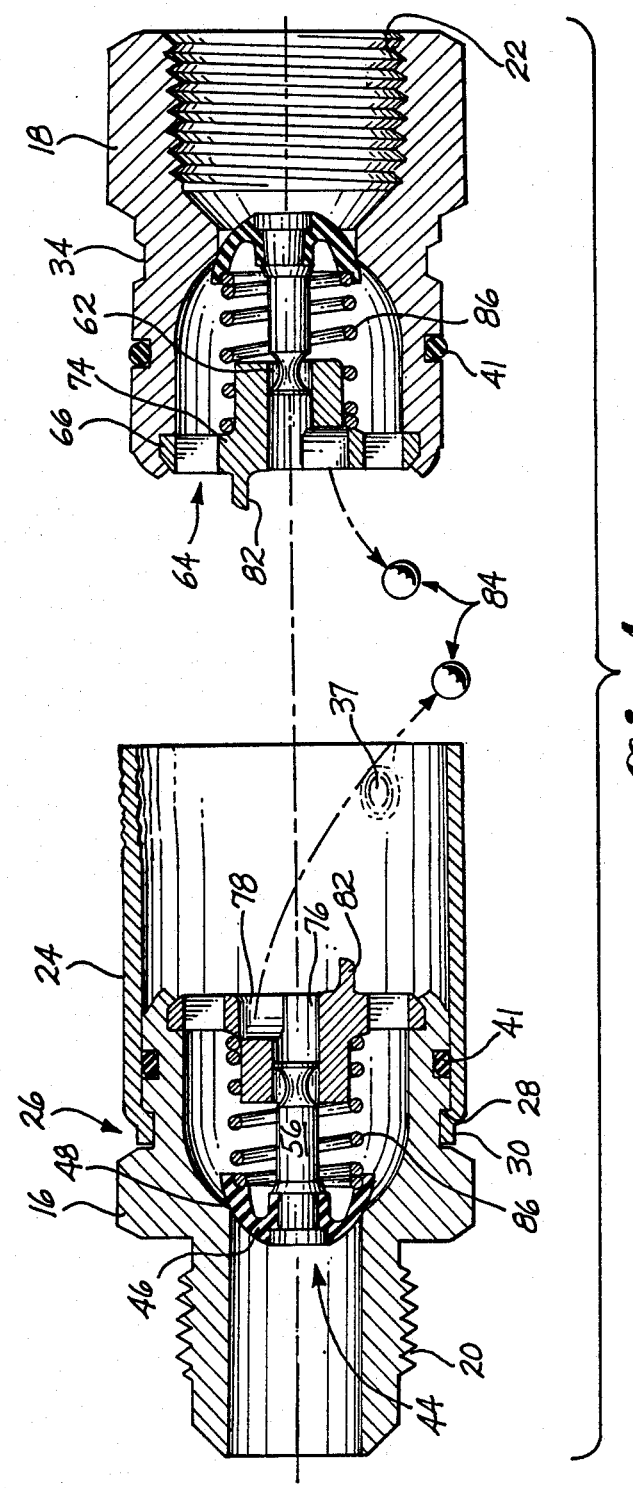
FIG. 4 is like FIG. 3 except that it shows the valve bodies separated and the second joint detached.

FIG. 4 shows the valve 14 after tension forces have caused the detachment of the second joint 32. The tension forces have pulled the sleeve 24 off the second valve body 18 and, in the process, have smeared or flattened the dimples 36, as indicated at 37 in FIG. 4. The sleeve remains attached to the first valve body 16. The valve elements 44 have moved into their seated positions in which their seating surfaces 48 are urged against the seats 43 formed by the valve bodies 16, 18. The ball detents 84 are allowed to fall away from the valve bodies 16, 18. The seating of the valve elements 44 seals the flow passage 42 in each of the valve bodies 16, 18 to seal both ends of the disconnected fluid conduit In the preferred embodiment shown in FIG. 1, the seating of the valve elements 44 seals the opening in the associated tank 4 and the end of the crossover line 10. The springs 86 exert sufficient force to firmly hold the valve element heads 46 in sealing engagement with the seats 43 against the relatively low pressure (about 3 to 4 pounds per square inch) in the tanks 4 and line 10.

Figure 5:
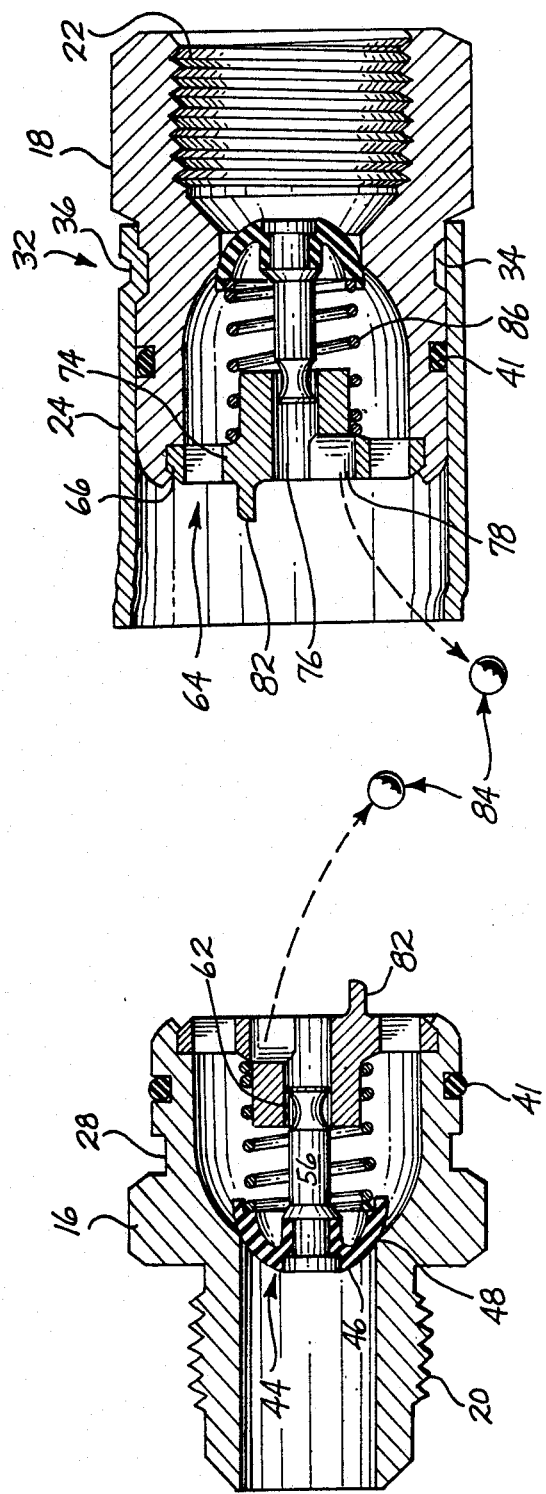
FIG. 5 is like FIG. 4 except that it shows the first joint detached.
Figure 6B:
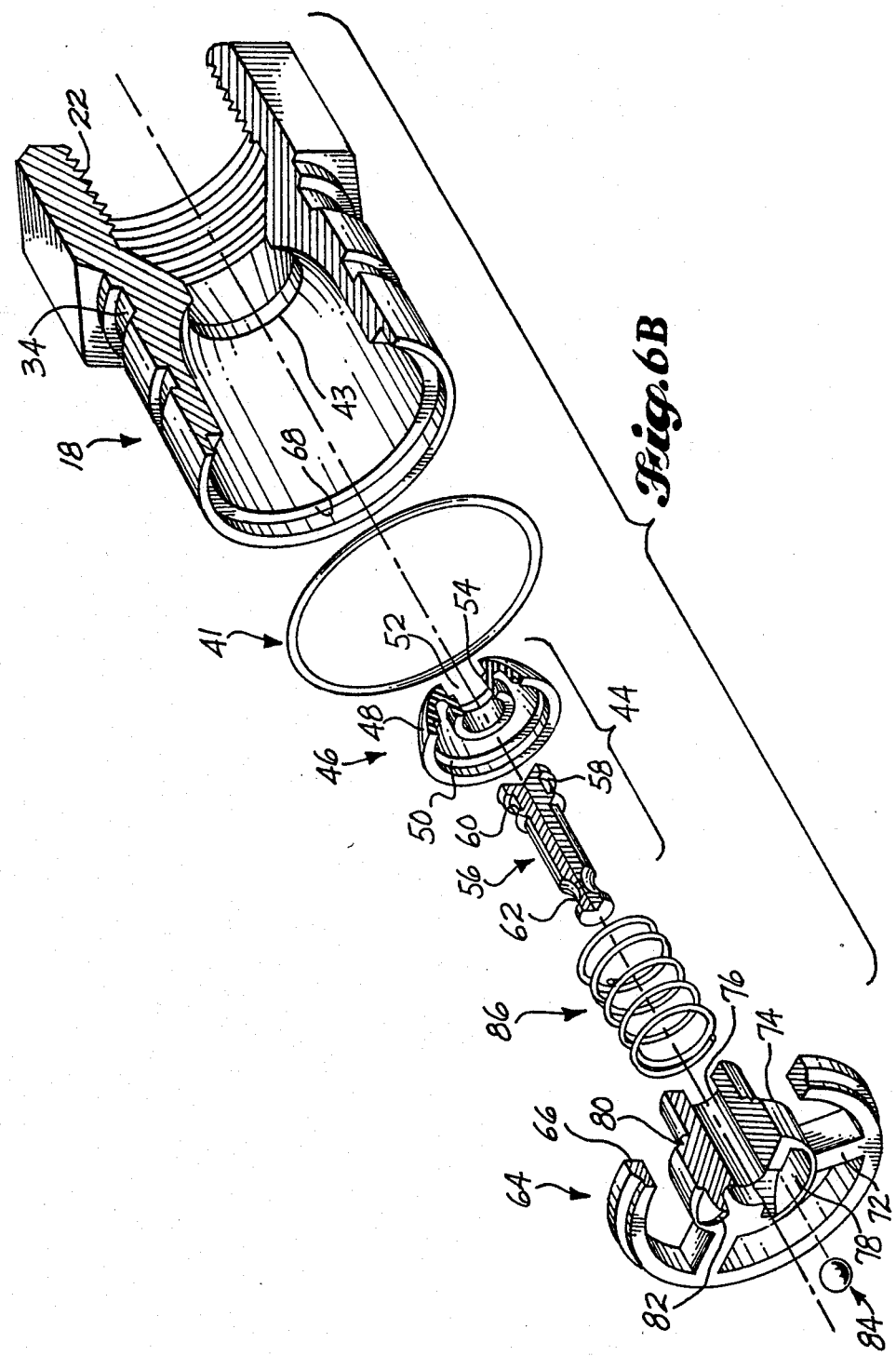

FIG. 5 illustrates the actuation of the valve 14 by bending forces As shown in FIG. 5, the bending forces have detached the first joint 26 by flattening and slightly flaring the end portions 30 of the sleeve 24 which were received into the groove 28 to form the first joint 26. The sleeve 24 remains attached to the second valve body 18. As in the situation when tension forces cause actuation of the valve, illustrated in FIG. 4, the valve elements 44 have seated to seal both ends of the flow passage 42.

As discussed above, the valve 14 provides protection against fuel loss and fire and other hazards. The valve 14 provides an intentional breaking link in the crossover system with automatic closure of the system. The automatic closure prevents fuel loss. The intentional breaking of the link prevents rupture of the crossover line and damage to the other components of the crossover system. Thus, when the crossover line 10 encounters an obstruction, there is a controlled separation and sealing of an easily replaceable breaking link that leaves the rest of the system intact and prevents loss of fuel.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. A fluid coupling comprising:
    a first valve body, and a second valve body releasably connected to said first body; and bodies having confronting outer end portions and defining a flow passage through the coupling;
    a valve element positioned in each of said bodies in said flow passage and having a recess formed thereon;
    biasing means for biasing each valve element axially inwardly toward a seated position in which it closes said passage;
    a support web carried by said outer end portion of each said body and having a projection extending axially outwardly therefrom; and
    a ball detent corresponding to each valve element and received into the recess thereon;
    each of said projections being positioned to retain the ball detent in the recess on the valve element positioned in the confronting valve body to prevent the valve element from moving axially inwardly toward its seated position when said bodies are connected, and to allow the ball detent to move out of the recess and the biasing means to seat the valve element when said bodies are detached.

2. The coupling of claim 1, in which each valve elements includes a head forming a seating surface and a spring abutment substantially opposite said seating surface, and a shaft extending axially outwardly from the head; each web includes a spring abutment, a center axial opening for receiving the shaft of the corresponding valve element, and a second opening extending radially outwardly from said center axial opening for receiving the projection on the confronting web; and the biasing means comprises a spring positioned between said spring abutments in each valve body.

* * * * *

UNITED STATES PATENT AND TRADEMARK OFFICE
CERTIFICATE OF CORRECTION

PATENT NO. : 4,899,786

DATED : February 13, 1990

INVENTOR(S) : John M. Morris, Zdenek Gabrlik and Charles J. Green

It is certified that error appears in the above-identified patent and that said Letters Patent is hereby corrected as shown below:

Title page:

In the Abstract, the 8th line from the bottom, "(26, 31)" should be -- (26, 32) --.

In column 3, line 24, there should be a period after "line".

In column 3, lines 34 and 35, there should be a period after "coupling".

In column 6, lines 15 and 16, there should be a period after "applicant".

In column 6, line 40, there should be a period after "structure".

In column 8, line 11, delete "35" at the end of the line.

In column 8, line 24, "Figs. and 5" should be
-- Figs. 4 and 5 --.

UNITED STATES PATENT AND TRADEMARK OFFICE
CERTIFICATE OF CORRECTION

PATENT NO. : 4,899,786
DATED : February 13, 1990
INVENTOR(S) : John M. Morris, Zdenek Gabrlik and Charles J. Green It is certified that error appears in the above-identified patent and that said Letters Patent is hereby corrected as shown below:

In column 8, line 37, "shoulders 58" should be
 -- shoulders 58, 60 --.

In column 8, lines 38 and 39, "shoulder engages" should be
 -- shoulder 58 engages --.

In column 8, in line 57 and in line 58, "body 6, 18" should
 be -- body 16, 18 --.

In column 8, line 62, "shaft 6" should be -- shaft 56 --.

In column 8, line 65, "projection 2" should be
 -- projection 82 --.

In column 9, line 43, there should be a period after "conduit".

In column 9, line 52, there should be a period after "forces".

In claim 2, column 10, lines 47 and 48, "elements" should
 be -- element --.

Signed and Sealed this

Twentieth Day of August, 1991

Attest:

HARRY F. MANBECK, JR.

Attesting Officer

Commissioner of Patents and Trademarks